United States Patent [19]

Hamel

[11] Patent Number: 4,505,176
[45] Date of Patent: Mar. 19, 1985

[54] BANDMILL MECHANISM

[75] Inventor: Gerald Hamel, St-Ephrem, Canada

[73] Assignee: Industries P. H. L., Inc., St-Ephrem, Canada

[21] Appl. No.: 423,023

[22] Filed: Sep. 24, 1982

[51] Int. Cl.$^3$ .......................................... B27B 13/08
[52] U.S. Cl. ........................................ 83/808; 83/819
[58] Field of Search ............... 83/818, 819, 817, 816, 83/814, 507, 503, 344, 699, 508.2; 403/DIG. 8, 161–163; 74/45, 47

[56] References Cited

U.S. PATENT DOCUMENTS

| | | | |
|---|---|---|---|
| 618,655 | 1/1899 | Field | 403/162 |
| 2,711,196 | 6/1955 | Daniel | 83/818 |
| 2,814,318 | 11/1957 | Brown | 83/818 |
| 3,810,409 | 5/1974 | Allen | 83/818 |
| 3,838,620 | 10/1974 | Baldrey | 83/819 |
| 3,905,266 | 9/1975 | Weavell et al. | 83/818 |
| 4,061,066 | 12/1977 | Mueller | 83/819 |
| 4,329,901 | 5/1982 | Stroud | 83/818 |

FOREIGN PATENT DOCUMENTS 994215  8/1976  Canada ........................... 143/14

Primary Examiner—James M. Meister
Assistant Examiner—John L. Knoble
Attorney, Agent, or Firm—Murray Schaffer

[57] ABSTRACT

In a bandmill having a column and a pair of arbor-supported wheels carrying and driving an endless saw, a mechanism is provided to move the first wheel relative to the second wheel to accommodate fluctuations resulting from saw loading conditions; the mechanism comprises: a vertical post having one end slidably received in the column; a horizontal plate fixed to the other end of the post; a arbor support fixedly mounted to the plate and having a hinge portion; a tension arm having a first portion attached to the arbor and a second portion extending lengthwise over the plate; and resilient elements located between the second portion of the tension arm and the plate. The arbor of the first wheel includes a central section to which the first wheel is mounted for rotation about a first axis and an end section hingedly connected to the hinge portion of the arbor support along a second axis which is eccentric relative to the first axis; the end section has a recess so shaped as to receive the hinge portion therein and to allow pivotal movement of the arbor about the eccentric axis.

5 Claims, 4 Drawing Figures

BANDMILL MECHANISM

FIELD OF THE INVENTION

The present invention relates to a mechanism mounted in a bandmill for accommodating fluctuations resulting from saw-loading conditions.

BACKGROUND OF THE INVENTION

In Canadian Pat. No. 994,215 issued Aug. 3, 1976 to Baldrey et al, there is described a strain mechanism for loading the saw of a bandmill. The strain mechanism comprises a yoke assembly which is slidably mounted within a column forming part of bandmill and which includes a hinge portion. A carrier arm supports the arbor of one of the wheels of the bandmill and is equipped with a hinge portion which is complementary to the hinge portion of the yoke assembly so as to form a hinge to journal the carrier arm to the yoke assembly to permit rotation of the arm relative to the yoke assembly. An air spring extends between the carrier arm and the yoke assembly to rotate the carrier arm relative to the yoke assembly to strain the saw.

The central axis of the arbor carrying the wheel is at some distance from the hinge axis of the yoke assembly and the carrier arm. It has been found that the distance separating these two axes is such as to allow a twisting effect to occur in cases where the strain exerted on one mechanism located on one side of the wheel is different from that on the other mechanism on the other side of the wheel. This may occur, for example, when uneven pneumatic pressure exists in the air springs or when there are variations in strain crosswise of the saw resulting from either variation in its construction or from uneven wear.

OBJECTS AND STATEMENT OF THE INVENTION

The present invention is concerned with a mechanism which overcomes the above mentioned problems. This is achieved by eliminating to a substantial degree the distance separating the two axes, i.e., the hinge axis and the arbor axis.

The present invention makes use of a hinge axis which is located on the arbor itself but which is eccentric to the central axis of the arbor.

The present invention therefore relates to a mechanism for use in a bandmill which comprises, in its broadest aspect: a post having one end slidably received within the bandmill column; a plate fixed to the other end of the post; an arbor support fixedly mounted to the plate and having a hinge portion; the arbor of the first wheel includes a central section adapted to receive the first wheel for rotation about a first axis and an end section pivotally connected to the hinge portion of the arbor support along a second axis, eccentrically disposed relative to the first axis; the end section having a recess to receive the hinge portion therein and is so shaped as to allow pivotal movement of the arbor about this eccentric axis. The mechanism also includes a tension arm, which has a first portion fixedly attached to the arbor and a second portion which extends lengthwise over the plate, and resilient means located between the second portion of the tension arm and the plate for causing pivotal movement of the arbor about the eccentric axis to accommodate the above mentioned fluctuations as a result of a saw-loading.

It has been found that the present invention permits the construction of a bandmill with such a mechanism on only one side of the wheel. However, it is preferable to have such mechanism on both sides of the wheel.

The scope of applicability of this invention will become apparent from the detailed description given hereinafter. It should be understood, however, that this description, while indicating preferred embodiments of the invention, is given by way of illustration only, since various changes and modifications within the spirit and scope of the invention will become apparent to those skilled in the art.

DESCRIPTION OF PREFERRED EMBODIMENTS

Figure 1:
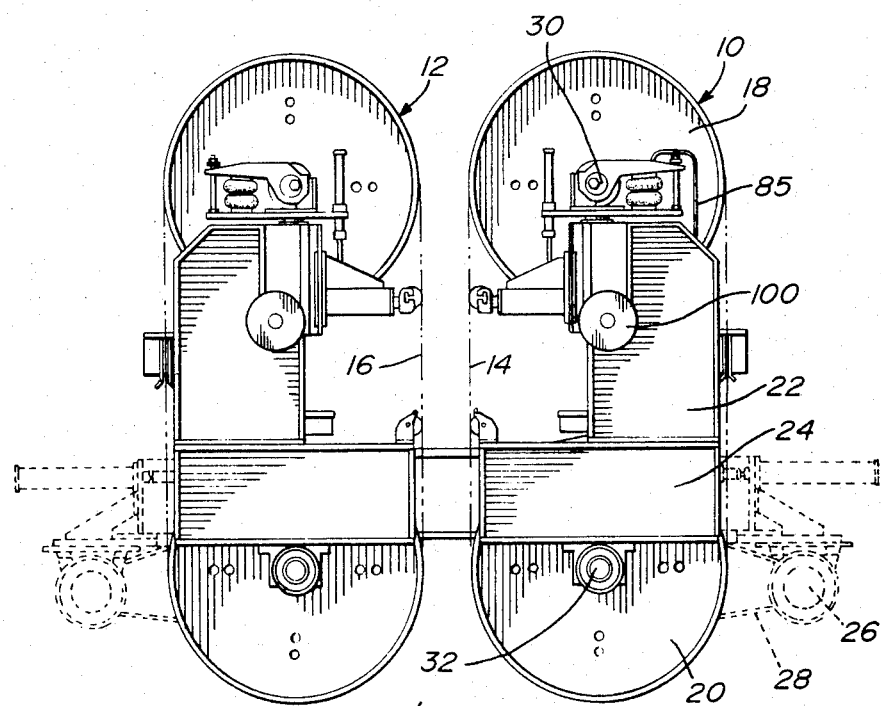
FIG. 1 is a front elevation of an assembly of bandmills made in accordance with the present invention.

Referring to FIG. 1, there is shown a twin bandmill assembly which consists of two bandmills 10 and 12 disposed in a side-by-side arrangement so that their respective band saws 14, 16 (shown in dotted lines) may simulteanously cut through lumber passing in a direction perpendicular to a plane extending through both bandmills. The latter are identically constructed; therefore, only the construction of bandmill 10 will be described. Furthermore, in some cases, only one bandmill may be mounted for sawmill operation. Still, it should be understood also that bandmill 10 shown in a vertical position in FIG. 1, may also be constructed to lie in a horizontal position.

Figure 2:
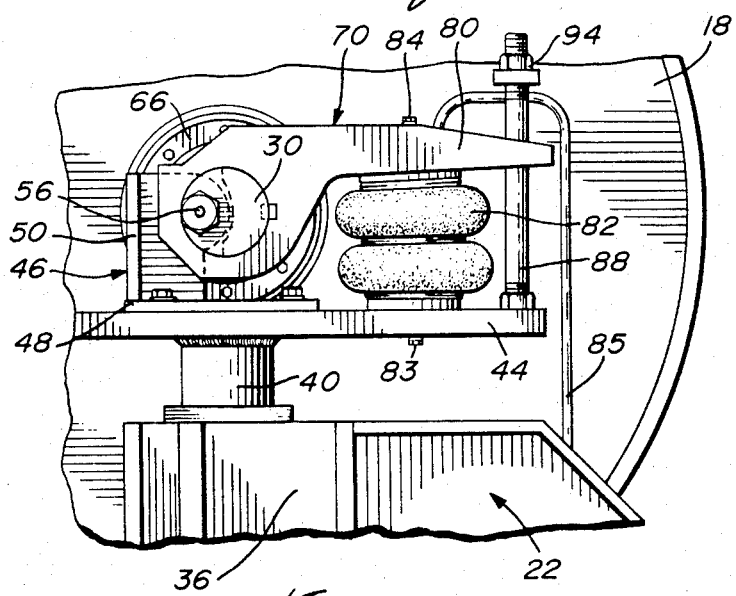
FIG. 2 is an enlarged fragmented front elevation of one bandmill showing its strain mechanism.
Figure 3:
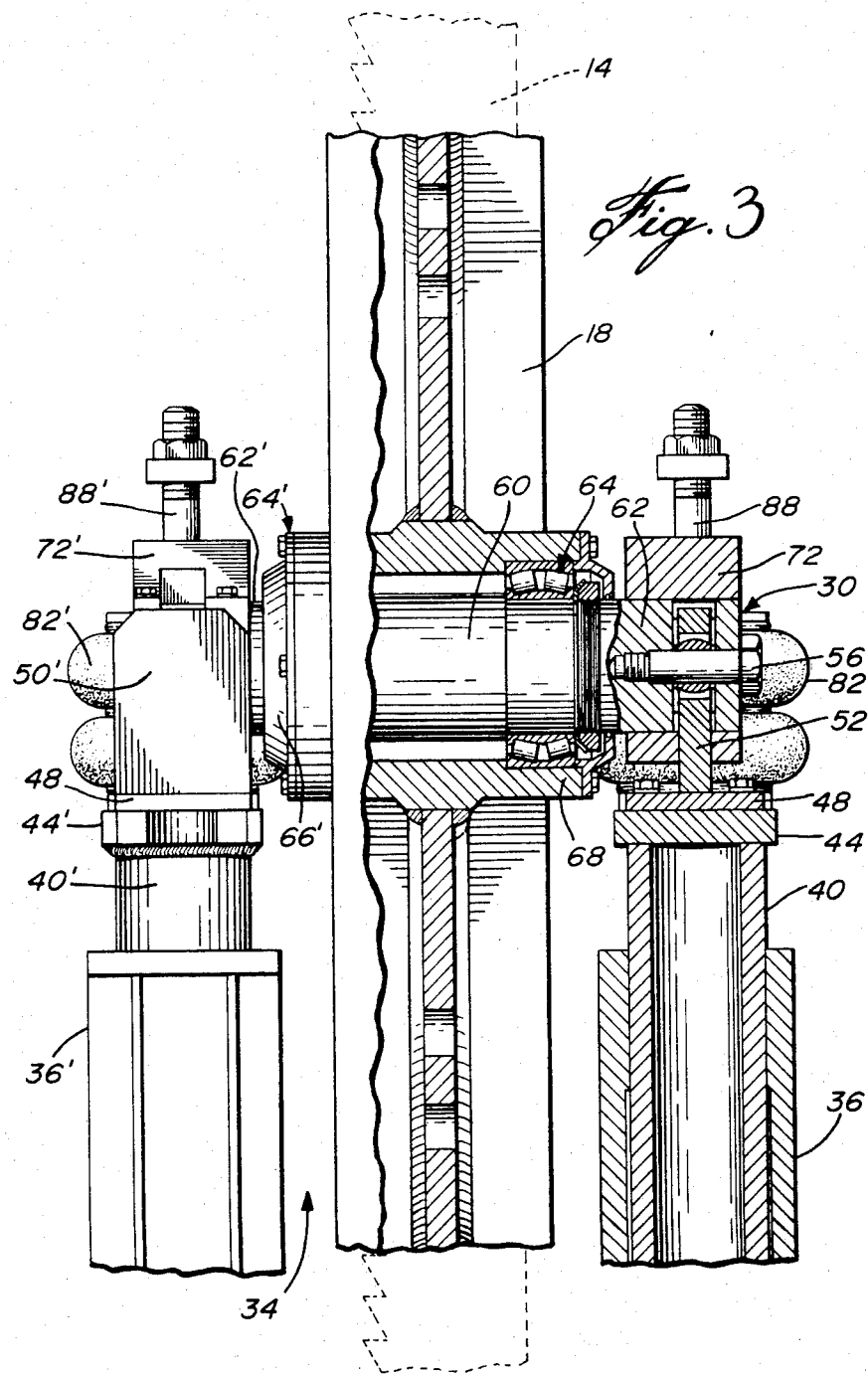
FIG. 3 is a side elevation view, partly in cross-section, showing the mechanism illustrated in FIG. 2.
Figure 4:
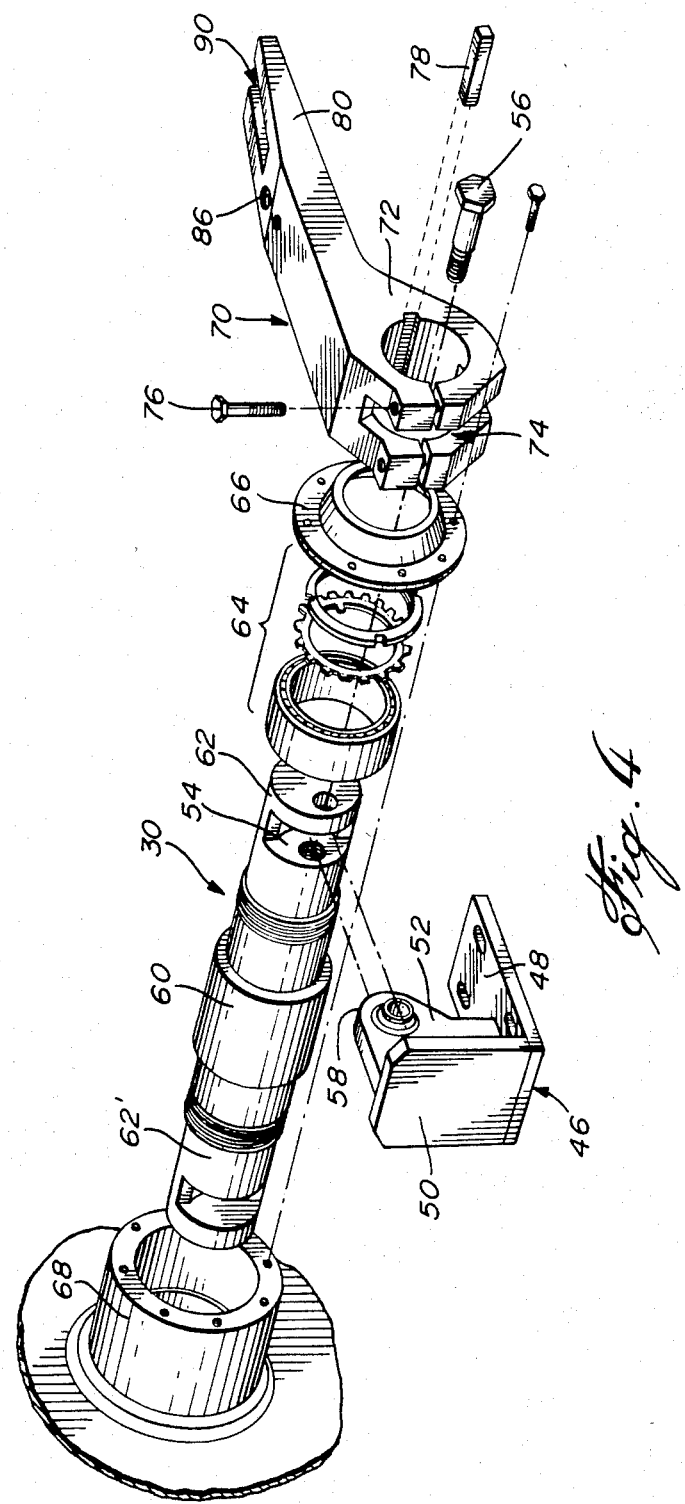
FIG. 4 is an exploded perspective view showing some of the components of the strain mechanism.

Bandmill 10 displays an upper wheel 18 and a lower wheel 20. The upper wheel is supported in a column 22 solidly resting on a base 24 while the lower wheel 20 is mounted to the base 24 and is driven by a motor 26 through appropriate drive means 28, both shown in broken lines. The upper and lower wheels are mounted for rotation about respective arbors 30, 32; they carry and drive the endless saw 14. One problem associated with using a band-saw of the type described is that the thin flexible saw-band is laterally deflected by knots in the timber resulting in oscillation of the saw-band. There results a wavy surface on the wood as well as induced stresses in the band which shortens its life. Referring more particularly to FIGS. 2, 3 and 4, a blade tensioning system is shown which is designed to reduce lateral deflections of the band-saw and to quickly damper any tendencies of the blade to deflect. The mechanism illustrated is adapted to move wheel 18 relative to wheel 20 in the vertical plane of the bandmill, i.e. in a plane that includes both wheels.

The upper portion of column 22 has a clearance 34 (see FIG. 3) to define, on each side of wheel 18, separated column upper sections 36, 36'. A strain mechanism is provided on each section. However, as both mechanisms are identically constructed, only one mechanism needs be described; the corresponding parts of the other mechanism will bear the same reference numerals with the addition of a prime mark. Each mechanism includes a vertical post 40 which has one portion slidably receive within the cylindrical bore provided in the column section 36. A horizontal plate 44 is fixed to the upper end of the post outside section 36. An arbor support 46 consisting of an horizontal portion 48 and of a vertical portion 50 is secured to the top face of plate 44 through appropriate fastening means. A vertically extending hinge portion 52 is secured to both portions 48 and 50.

Referring to FIG. 4, the hinge portion 52 is shaped to be received in a complementary shaped recess 54 provided in the arbor 30. The arbor support is connected to the arbor through an appropriate fastening means, such as bolt 56 thereby providing a pivot axis which is eccentric to the central axis of the arbor. The hinge portion 52 has a curved projecting surface 58 which mates with the similarly curved inner wall of recess 54.

The arbor has an enlarged central portion 60 and two smaller opposite end portions 62 and 62' in which the recesses are provided. A roller bearing arrangement 64, 64' is provided at each end of portion 60 to allow rotation of the upper wheel 18 relative to the arbor portion 60. Covers 66, 66' are secured to the hub portion 68 on the wheel to enclose the bearing arrangements therein.

A tension arm 70 is mounted to end portion of the arbor and includes a section 72 engaging the end portion 62 of the arbor. This section has a clearance 74 in registry with the hinge portion 52 of the arbor support and recess 54 of the arbor to enable engagement of the support with the arbor. Appropriate fastening means, such as bolt 76, secure the tension arm onto the arbor end portion. A key 78 of rectangular cross-section fits into similarly-shaped keyways in the bore of arm section 72 and in the outer wall of arbor end portion 62.

The tension arm 70 has a further section 80 which extends over the horizontal plate 44. A resilient body 82 extends between section 80 and plate 44 and is maintained therebetween by means of two cap screws 83 and 84 which are respectively fixed to plate 44 and the tension arm section 80. The resilient member 82 is in the form of a rubber-like cushion having an enclosed chamber in communication with a supply (not shown) of pressurized gas through a hose 85.

To limit the pivotal movement of arm 70 in a counter-clockwise direction, a rod 88 is fixed to plate 44 and extends upward through a clearance 90 at one end of the arm section 80. The upper end of rod 88 is threaded so that a nut 94 may be positioned thereon at a given distance from arm 70 thereby limiting the upward movement of the arm.

A hand wheel 100 which is to be used by an operator is connected through a worm-gear arrangement 25 to the lower end of post 40 inside column 22. By actuating this hand wheel, the operator provides for fine adjustment of the upper wheel position to attain a desired strain on the band-saw. A detailed description of the worm-gear connection is not deemed necessary as it is commonly known, even in this particular bandmill art. Other connection arrangements are therefore also possible.

During operation of the bandmill, fluctuations resulting from saw loading conditions momentarily increases the tension in the saw and the movements of the upper wheel as a result of these fluctuations are transmitted to the arbor 30 which, in turns, pivots about the eccentric axis on the hinged portion 52 of the arbor support. The pressure inside the chamber of cushion 82 reacts on the tension arm which is directly connected to the arbor. Therefore, any pivotal variation of the arbor is resisted by the air pressure inside the resilient member 82 to maintain blade stability. An important feature of the present system is the short distance existing between the eccentric axis and the central axis, both axes being on the arbor. In the embodiment illustrated in FIG. 3, where two strain mechanisms are used, this advantage has some importance. Indeed, in cases where the distance between the eccentric axis and the central axis would be of importance such as in the bandmill described of the above-mentioned Canadian patent, any non-similarities between the hinge movement on one end section of the arbor and the hinge movement on the other end section of the arbor result in a twisting effect on the arbor which further causes the arbor to adopt a position away from its desired horizontal position. In the embodiment of FIG. 3, such effect is practically nil due to the very short distance existing between the two axes.

Although this invention has been described in relation to one specific form, it will be evident to the person skilled in the art that it may be refined and modified in various ways. For example, with the particular feature of the present invention, it is possible to provide a bandmill with only one strain mechanism on one side of the upper wheel. It is therefore wished to have it understood that the present invention should not be limited in interpretation except by the terms of the following claims.

The embodiments of the invention in which an exclusive property or privilege is claimed are defined as follows:

1. In a bandmill having a frame respectively supporting first and second arbor-supported wheels carrying and driving an endless saw, a mechanism adapted to move said first wheel relative to the second wheel in a plane including said wheels to thereby accommodate fluctuations resulting from saw-loading conditions, said mechanism comprising:
    (a) a post having one end slidably received within said column;
    (b) a plate fixed to the opposite end of said post outside said column;
    (c) an arbor support fixedly mounted to said plate and having a hinge portion with a pivotal axis; the arbor of said first wheel including a central section adapted to receive said first wheel for rotation about a first axis and an end section coaxial with said central section; said hinge portion of said arbor support projecting within said end section of said arbor to a point such that said pivotal axis extends within said arbor but eccentric to said first axis; said end section having a recess to receive said hinge portion therein and being so shaped as to allow pivotal movement of said arbor about said pivotal axis;
    (d) a tension arm having a first portion fixedly attached to said arbor and a second portion extending lengthwise over said plate; and
    (e) resilient means located between said second portion of said tension arm and said plate for causing pivotal movement of said arbor about said eccentric axis to accommodate said fluctuations.

2. In a bandmill as defined in claim 1, further comprising means mounted to said column for sliding said post in said column to strain said saw.

3. In a bandmill as defined in claim 2, wherein said sliding means comprises manually operable worm-gear means engaging said one end of said post in said column and means extending outside said column to allow actuation of said worm-gear means.

4. In a bandmill having a column and a frame respectively supporting first and second arbor-supported wheels carrying and driving an endless saw, an arbor for said first wheel, said arbor including a central section adapted to receive said first wheel for rotation about a first axis and opposite end sections each coaxial with said central section; a pair of mechanisms on each side of said first wheel adapted to move said first wheel relative to the second wheel in a plane including said wheels to thereby accommodate fluctuations resulting from saw-loading conditions, each mechanism comprising:

(a) a vertical post having one end slidably received within said column;

(b) a horizontal plate fixed to the opposite end of said post outside said column;

(c) an arbor support fixedly mounted to said plate and having a hinge portion with a pivotal axis, said hinged portion projecting within a corresponding end section of said arbor to a point such that said pivotal axis extends within said arbor but eccentric to said first axis; each said end section having a recess to receive said hinge portion therein and being so shaped as to allow pivotal movement of said arbor about said eccentric axis;

(d) a tension arm having a first portion fixedly attached to said arbor and a second portion extending lengthwise over said plate; and (e) resilient means located between said second portion of said tension arm and said plate for causing pivotal movement of said arbor about said eccentric axis to accommodate said fluctuations.

5. In a bandmill as defined in claim 1, further comprising means mounted on said plate and engaging said second portion of said tension arm for limiting movement of said carrier arm relative to said plate.

* * * * *